United States Patent [19]
Balser

[11] 3,893,060
[45] July 1, 1975

[54] AIRCRAFT VORTEX DETECTION SYSTEM
[75] Inventor: Martin Balser, Covina, Calif.
[73] Assignee: Xonics, Inc., Van Nuys, Calif.
[22] Filed: Aug. 28, 1973
[21] Appl. No.: 392,254

[52] U.S. Cl. .............................. 340/1 R; 340/3 D
[51] Int. Cl. .............................................. G01s 9/66
[58] Field of Search ............ 340/1 R, 3 D; 343/5 W, 343/9

[56] References Cited
UNITED STATES PATENTS
3,671,927 6/1972 Proudian et al. .................... 340/1 R
3,735,333 5/1973 Balser et al. ....................... 340/1 R Primary Examiner—Richard A. Farley
Attorney, Agent, or Firm—Harris, Kern, Wallen & Tinsley

[57] ABSTRACT

Method and apparatus for aircraft vortex detection. An acoustic echo system or acoustic radar with adjacent transmitter and receiver using backscatter echoes for vortex indication. A signal processor providing a continuous real time indication and display of vortex position in the zone of interest.

14 Claims, 4 Drawing Figures

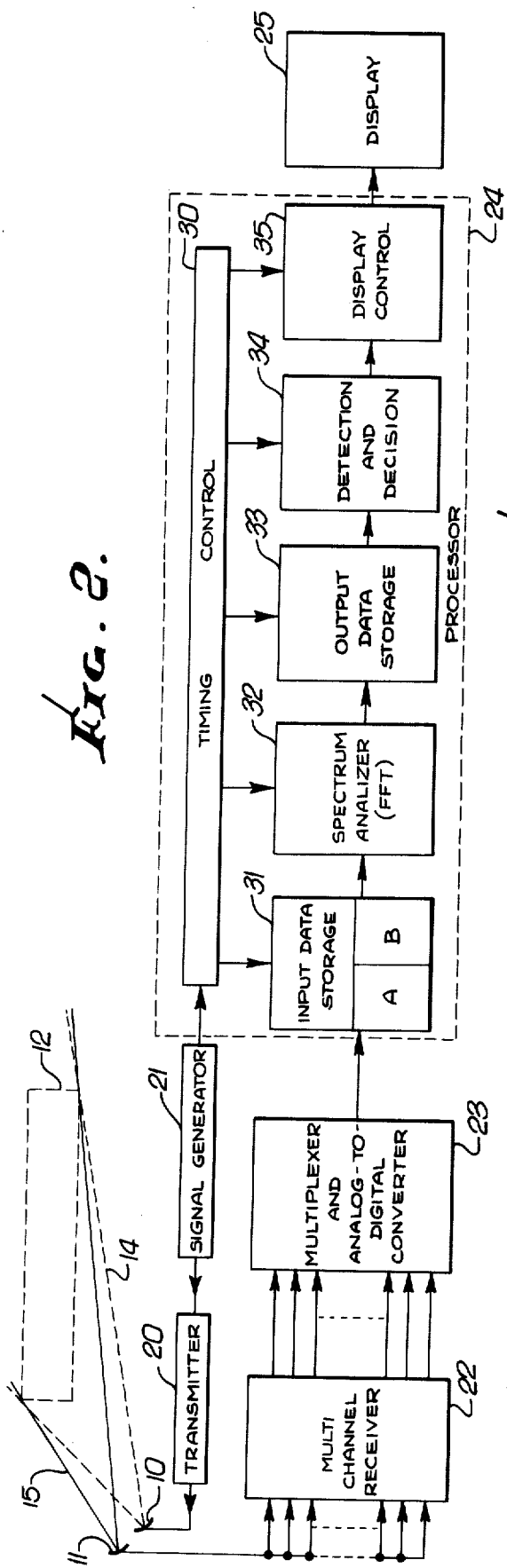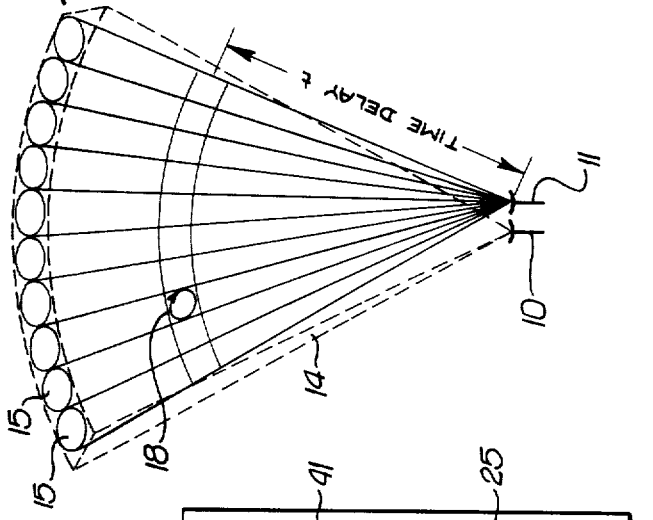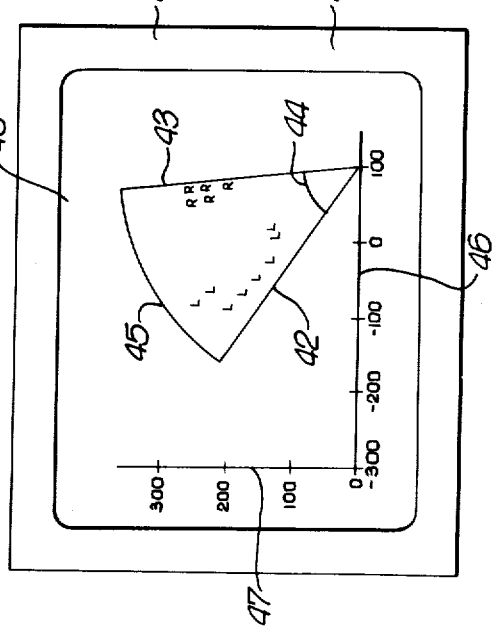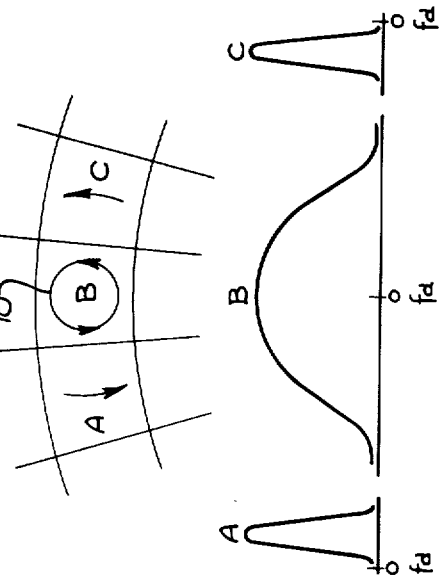

AIRCRAFT VORTEX DETECTION SYSTEM

This invention relates to a new and improved method and apparatus for the remote measurement and real-time display of aircraft trailing vortices. Various aspects of a system for detection and tracking of vortices based on the forward scattering of acoustic waves by the vortex disturbance and the doppler frequency analysis of the received signals are disclosed in U.S. Pat. Nos. 3,671,927 and 3,735,333. Two major features distinguish the system described herein from those of the earlier patents.

In contrast to the earlier bistatic configuration, in which the transmitter and the receiver were at different sites, and the scattering is correspondingly described as forward or oblique scattering, the current system is a backscatter system, i.e., the transmitter and receiver are colocated and a signal must therefore retrace its path, or be backscattered, to reach the receiver.

Also, in contrast with the human processing of the data employed in the earlier systems, the new system includes a real-time signal processor that automatically processes the received signals and detects and locates vortices that are present in the field of view and then displays that information and makes it available for further processing or alternate displays.

Early emphasis on development of the bistatic system of the prior art was based at least in part on theoretical considerations. The conventional analysis used to estimate the signal strength to be expected from the acoustic scattering by a vortex involves a first-order approximation, the result of which is an expression for the scattering crosssection per unit volume $\sigma(\theta)$ in the direction of $\theta$ ($\theta = 0$ for the forward direction; $\theta = \pi$ for backscatter). This expression may be given in the form $$\sigma(\theta) = 2\pi k^4 \cos^2\theta \left[ \frac{\cos^2\theta/2}{c^2} E(2k\sin\theta/2) + \frac{1}{4T^2}\phi(2k\sin\theta/2) \right]$$

where,
$k = 2\pi/\lambda$, $\lambda$ being the wavelength of the acoustic wave.
$E(K)$ = the spectrum of velocity fluctuations with wave number K
$\phi(K)$ = the spectrum of temperature fluctuations
$c$ = the velocity of sound
$T$ = the temperature The spectra $E(K)$ and $\phi(K)$ may in general be expected to decrease with increasing $K$, and thus result in somewhat weaker scattering for backscatter than for lesser scattering angles. The explicit angular factors are however more dramatic in their effect. For example, the factor $\cos^2\theta$ that multiplies the whole expression indicates that there should be no scattering at all at right angles to the direction of incidence, consistent with the physical intuition that a longitudinal acoustic wave in an isotropic medium should not excite waves with motion perpendicular to its own. More relevant to this discussion is the term $\cos^2\theta/2$ associated with the velocity fluctuations, which indicates that those fluctuations contribute nothing to the backscattered signal.

Some advantages in signal strength that inhere in the backscatter approach tend to balance at least part if not all of the advantage by an unknown amount of the scattering strength for the bistatic system due to its forward scattering. The range to the vortex target is reduced for a backscatter system, typically by a factor of 2; assuming that the vortex fills the radar beam in its axial direction, the range-cubed dependence yields a 9db advantage to the backscatter system. The attenuation corresponding to this same path difference, which depends on the range and atmospheric conditions and may be considerable, also accrues to the advantage of the backscatter system.

In addition to these technical advantages, logistic and cost factors weigh heavily in favor of the backscatter system. For example, the need for communication, including the passage of synchronization signals, between widely separated sites is eliminated. The real-estate problem is greatly eased in that only one site is required, and that along the runway extension. Particularly on approaches over water, this factor alone could spell the difference between a practical and an impractical system. In addition, some scanning capability along the flight path is facilitated. Finally, and by no means least, the system cost of a system that occupies one site (probably already supplied with power), is bound to be considerably lower than for any of the systems heretofore considered.

Thus while theoretical considerations indicate that little or no useable echoes might be received with an acoustic echo system in the backscatter configuration, such a system has none the less been developed and successfully operated in the detection and display of wing tip vortices from large jet aircraft at a major commercial airport.

The present system utilizes an acoustic echo system or acoustic radar with the transmitter and receiver transducers positioned adjacent each other for operation in the backscatter configuration, that is, the receiver receives acoustic energy of the transmitter backscattered by vortices in the zone illuminated or energized by the transmitter. The transmitter beam is a large fan-shaped beam covering the zone of interest, while the receiver beam is a plurality of side-by-side beams which together coincide with the transmitter beam. The transmitter is pulsed and the time of arrival of an echo at the receiver provides the range information permitting the zone of interest to be divided into a matrix of cells defined by the individual receiver beams and the range steps, one specific embodiment of the system having a matrix of ten receiver beams and ten range steps providing one hundred individual cells.

The system further provides for spectrum analysis of the echo from each cell, storage of the spectrum, and examination of the stored spectrum, providing a vortex indication signal for each cell location. A display unit in the form of a cathode ray tube display providing a visual location of the vortices is also utilized.

Accordingly, it is an object of the invention to provide a new and improved vortex detection method and apparatus. An additional object is to provide such a system operating in the backscatter configuration. A further object is to provide such a system including signal processing for real-time indication and display of vortices.

Other objects, advantages, features and results will more fully appear in the course of the following description. The drawing merely shows and the description merely describes a preferred embodiment of the present invention which is given by way of illustration or example.

In the drawing:

FIG. 1 is a diagram illustrating the transmitter and receiver beams in the vertical configuration;

FIG. 2 is a diagram illustrating the transmitter and receiver beams in a side-looking configuration, and includes a block diagram of an acoustic echo system incorporating the presently preferred embodiment of the invention;

FIG. 3 is a view of a display unit suitable for use with the system of the invention; and FIG. 4 is a diagram illustrating the operation of the system.

Typically an aircraft vortex detection system may be required to cover an approach zone located along the extension of an airport runway in the order of 500 feet wide and 100 feet high, centered at an altitude of 200 feet. In one configuration, the transmitter transducer array 10 and the receiver transducer array 11 are positioned side by side directly below the approach path, as illustrated in FIG. 1. In an alternative configuration that is particularly applicable to very low altitude operations, a sideward looking arrangement may be utilized with the transmitter and receiver arrays positioned to one side, as illustrated in FIG. 2, where the rectangular 12 indicates the approach zone of interest.

A typical system operates as follows. The transmitting antenna or transducer 10 radiates a single fan beam 14, which illuminates the plane perpendicular to the direction of flight. This beam may be generated by a row of square horns, each equipped with its own driver, all of which are operated in phase. The modulation is a pulse train, with a pulse length typically of 40 to 80 msec (corresponding to a height resolution of 20 to 40 feet) and a pulse repetition interval of about 1 second (more or less depending on the altitude being covered).

The receiving antenna or transducer 11 is located in the immediate vicinity of the transmitting transducer 10 and generates a set of pencil beams 15. These pencil beams 15 together cover the same fan-shaped region illuminated by the transmitter beam 14, but each pencil beam is examined separately to obtain the corresponding angular resolution. The receiving antenna may be a parabolic dish with an array of microphones along a line in the feed plane to produce the beams.

A vortex 18 that scatters energy back to the receiver is located as shown in FIG. 1. Two coordinates are required to fix the location in the plane of coverage common to the two antennas. One of these is provided by the specific receiver beam in which the vortex is detected. The position along that beam is given by the time delay t after the transmission of the pulse at which the scattered signal is received. In FIG. 1, the vortex is shown to be detected in the third receiver beam at a range determined by the delay t. It is important to bear in mind that the width of the spectrum, and not just its amplitude, may be used in identifying the disturbance as a vortex, in fixing its location accurately, and in estimating the hazard.

An overall system is illustrated in block diagram form in FIG. 2 and includes a transmitter 20 with pulse generator 21, a multichannel receiver 22, a multiplexer and analog-to-digital converter 23, a signal processor 24, and a display unit 25. The signal processor includes a timing control unit 30, an input data storage unit 31, a spectrum analyzer 32, an output data storage unit 33, a detection and decision unit 34, and a display control unit 35.

The pulse modulation controlled by the signal generator 21 is radiated by the transducer 10 of the transmitter 20, and the timing from the signal generator is communicated to the processor 24. The ten received signals corresponding to the ten receiver beams are preprocessed in the receiver 22, one to each channel. The receiver includes amplification and filtering stages to produce at the output of each channel a signal of the desired bandwidth and voltage level. Next the receiver output channels are rapidly cycled through in the multiplexer 23, and a sample taken and digitized with sufficient sampling frequency to define unambiguously the spectrum passed by the filter of each channel. These digital samples are stored in memory in storage unit 31 until a block of data corresponding to the pulse length is accumulated.

The entire cycle of the signal processor 24 is initiated by the transmitted pulse and thereafter is controlled by the timing control unit 30. After a fixed delay, corresponding to the minimum range of the desired coverage, the digitized samples of data for one analysis interval, corresponding to one pulse length or one range resolution cell, are stored in one section of storage unit 31 as previously indicated. During the next analysis interval, this first block of data from all the receiver channels, which occupies the half of input data storage unit 31 designated A, is put through the spectrum analyzer 32 and the output spectra are then stored in the output data storage unit 33. Due to the speed with which these spectral analyses must be accomplished (typically 10 spectra in a pulse length of 40 to 50 msec.), the spectrum analysis requires the use of a dedicated fast-fourier-transform(FFT) device. Simultaneously with the spectral analysis of the first analysis interval, the new data for the second analysis interval are being read in and stored in the other half, designated B, of the input data storage unit 31. This alternating process of filling one half of the input data storage unit with fresh data while the data from the previous analysis period in the other half is being spectrally analyzed continues until a stop signal is received from timing control unit corresponding to maximum range of the desired coverage. At this time, a spectrum for each range resolution cell in each beam is stored in the output data storage unit 33.

Next the examination of the spectra stored in 33 by the detection and decision unit 34 is initiated, with each spectrum being examined to determine if the presence of a vortex should be indicated. This operation which provides for detecting and locating vortex returns in real-time may be used with data obtained from bistatic systems as well as backscatter systems. The logic for detecting and locating vortex returns in real time consists essentially of an automatic pattern recognition of the characteristic spectral shape of a vortex. The basic logic may be understood by reference to FIG. 4, which shows the observed spectral shapes for three neighboring spatial resolution cells A, B, C. Cell B contains the center or core of the vortex 18 and its highest velocities. On either side, cells A and C contain the more uniform flow at lower velocities that occurs at distances somewhat removed from the core. If this is a view of the vortex looking along its axis in the direction of aircraft motion, then the pictured vortex originated at the right wingtip; the left vortex rotates in the opposite sense.

The spectra shown at the bottom of FIG. 4 represent the frequency analysis of the received signals from the three pictured spatial cells. The doppler frequency shift $f_d$ is proportional to the radial velocity of the scattering volume of air; motion toward the radar (downward) is represented by a shift to the right and motion away from the radar (upward) a shift to the left. Thus in cells A and C, the relatively uniform and lower velocities are represented by narrow spectra with a small shift in the appropriate direction. Cell B contains flow both upward and downward and at higher velocities, which produces a spectrum that both is broader and contains larger frequency shifts. It must be pointed out that in practice all the resolution cells always contain returns from ambient turbulence with a spectrum reflecting the ambient wind velocity. The vortex return cannot therefore be identified simply on the basis of the strength of the returned signal; the recognition of its characteristic pattern is essential.

An algorithm for recognizing the vortex may be represented by the equation $$W_T = aW_S + bW_D + cW_P$$

where the final assigned weight $W_T$ of a given spatial resolution cell is found from the weight $W_S$ derived from the measured frequency spread in the spectrum of that cell, the weight $W_D$ derived from the difference or shift in frequency between it and the neighboring cells and the weight $W_P$ determined by the history of detections in the vicinity of the cell. In effect, $W_P$ is an additional confidence factor based on previous tracking information, and is desirable though not essential. The constants $a$, $b$ and $c$ are fixed so as to give the desired relative emphasis to the three contributions. When the total weight $W_T$ exceeds a threshold, a vortex detection is declared in that cell. Its sense, i.e., whether it is a right or left vortex, is determined from the direction of maximum frequency shift in the neighboring cells, as described earlier.

The vortex recognition information is coupled to the display control unit 35, which takes the basic information and places it in the proper format and provides the proper interface signals to the display device 25. At the conclusion of the decision cycle, that information is read out. In one actual system, the components of the processor and their functions are obtained by a minicomputer and an associated hardwired FFT device.

The display unit 25 may be an oscilloscope, a teletype or other printer, or an alarm or other type of message generator. A presently preferred form of display unit is shown in FIG. 3 and comprises a cathode ray tube 40 in a suitable case 41.

Also, the vortex identification and position information from the processor may be used for further processing, for example the application of safety criteria based on known effects of a vortex with a given strength on various classes of aircraft, before the final output is achieved. The complete analysis process must be accomplished within one pulse repetition interval so that the system is ready for the next transmission which initiates the next cycle.

An example of the real-time display obtained with the system is shown in FIG. 3. The illustration of FIG. 3 is copied from a photograph of the display tube of an operating system, taken about 26 seconds after a 747 aircraft passed the site during the landing. The transmitter beam in this system is about 50° wide and the transmitter is located 100 feet to the right of the center line of the runway. The region of coverage is outlined by the straight lines 42, 43 and the arcs 44, 45, corresponding to the range used of the transmitter and receiver beams. Within that region, the letters L and R show the positions at which left and right vortices were detected. The horizontal line 46 and the vertical line 47 show in feet the cross range and height, respectively, of the L and R vortices. The display tube is a storage tube and all vortex detections up to the time shown remain on the screen and thereby trace out the vortex track. A new transmitter pulse and set of detections occurs once a second, and numerous detections in the figure are overlaid on previous detections, so that the number of detections represented by the picture greatly exceeds the number of letters shown. Auxiliary information, such as rate of descent and cross-wind velocity can be easily obtained from the vortex tracks, besides the principal information of the location of a potentially hazardous vortex as a function of time.

I claim:

1. In an aircraft vortex detection system, the combination of:
    an acoustic echo system transmitter including a first acoustic transducer system for directing energy toward a zone in a generally fan shaped beam, and control means for energizing said transmitter beam in pulses;
    an acoustic echo system receiver positioned adjacent said transmitter and including a second acoustic transducer system defining a plurality of generally side-by-side beams coincident with said transmitter beam for receiving acoustic energy of said transmitter backscattered by a vortex in a zone, and providing a receiver output for each receiver beam; and
    signal processor means having the receiver outputs as inputs for generating an output signal varying as a function of the backscatter echoes.

2. A system as defined in claim 1 wherein said signal processor means includes timing means having a signal from said control means as an input and providing a spatial identification of the zone occupied by the vortex producing the received backscatter echo.

3. A system as defined in claim 2 wherein said signal processor means includes,
    means for determining the frequency spread in a received backscatter echo,
    means for determining the frequency shift between received backscatter echoes of adjacent beams, and
    means for generating a display signal for a received backscatter echo having a frequency spread and shift greater than a predetermined value.

4. A system as defined in claim 1 including a display unit having a means for indicating the zone covered by the receiver beams and indicating therein the position of a vortex backscatter echo received by said receiver.

5. A system as defined in claim 4 wherein said display unit includes means providing separate indications for vortices from right and left wing tips of the aircraft producing the vortices.

6. A system as defined in claim 1 wherein said signal processor means includes:

timing means having a signal from said control means as an input and providing a range indication defining a plurality of range cells along each receiver beam;

a spectrum analyzer;

circuit means for connecting said receiver outputs to said spectrum analyzer as an input;

first storage means for storing spectra from said analyzer for each range cell of each receiver beam; and means for examining the stored spectrum of each range cell of each receiver beam and providing a vortex indication signal for each cell location.

7. A system as defined in claim 6 including a display unit having means for indicating the zone covered by the receiver beams and indicating therein the range cells of each receiver beam, and means for connecting the vortex indication signals to said display unit.

8. A system as defined in claim 6 wherein said circuit means includes second storage means for storing the received backscatter echoes of each receiver beam for a range cell.

9. A system as defined in claim 8 wherein said second storage means includes A and B sections, and a multiplexer for sequentially connecting each of the receiver outputs to one section of said second storage means with the other section connected to said spectrum analyzer, and then sequentially connecting each of the receiver outputs to the other of said sections with the one section connected to the spectrum analyzer.

10. A system as defined in claim 1 wherein said receiver is a doppler receiver for picking up doppler frequency backscattering by a vortex in the zone.

11. In an aircraft vortex detection system, the combination of:

an acoustic echo system transmitter including a first acoustic transducer system for directing energy toward a zone, and control means for energizing said transmitter beam in pulses;

an acoustic echo system receiver including a second acoustic transducer system defining a plurality of generally side-by-side beams for receiving acoustic energy of said transmitter scattered by a vortex in a zone, and providing a receiver output for each receiver beam; and signal processor means having the receiver outputs as inputs for generating an output signal varying as a function of the backscatter echoes, and including timing means having a signal from said control means as an input and providing a range indication defining a plurality of range cells along each receiver beam, a spectrum analyzer, circuit means for connecting said receiver outputs to said spectrum analyzer as an input, first storage means for storing spectra from said analyzer for each range cell of each receiver beam, and means for examining the stored spectrum of each range cell of each receiver beam and providing a vortex indication signal for each cell location.

12. A system as defined in claim 11 including a display unit having means for indicating the zone covered by the receiver beams and indicating therein the range cells of each receiver beam, and means for connecting the vortex indication signals to said display unit.

13. A system as defined in claim 11 wherein said circuit means includes second storage means for storing the received echoes of each receiver beam for a range cell.

14. A system as defined in claim 13 wherein said second storage means includes A and B sections, and a multiplexer for sequentially connecting each of the receiver outputs to one section of said second storage means with the other section connected to said spectrum analyzer, and then sequentially connecting each of the receiver outputs to the other of said sections with the one section connected to the spectrum analyzer.

* * * * *